(12) United States Patent
Fang et al.

(10) Patent No.: US 11,658,820 B2
(45) Date of Patent: May 23, 2023

(54) WORKFLOW FOR ENABLING DATA-IN-TRANSIT IN A DISTRIBUTED SYSTEM

(71) Applicant: VMware, Inc., Palo Alto, CA (US)

(72) Inventors: Wei Fang, Shanghai (CN); Haoran Zheng, San Jose, CA (US); Tao Xie, Shanghai (CN); Yun Zhou, Shanghai (CN); YangYang Zhang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 148 days.

(21) Appl. No.: 17/102,363

(22) Filed: Nov. 23, 2020

(65) Prior Publication Data
US 2022/0109570 A1    Apr. 7, 2022

(30) Foreign Application Priority Data
Oct. 5, 2020    (WO) ................ PCT/CN2020/119808

(51) Int. Cl.
*H04L 9/32*    (2006.01)
*H04L 9/40*    (2022.01)

(52) U.S. Cl.
CPC ............ *H04L 9/32* (2013.01); *H04L 63/0428* (2013.01)

(58) Field of Classification Search
CPC ..... H04L 9/40; H04L 9/16; H04L 9/32; H04L 963/0428
USPC ......................................................... 713/168
See application file for complete search history.

(56) References Cited

U.S. PATENT DOCUMENTS

| | | | | |
|---|---|---|---|---|
| 7,043,632 B2* | 5/2006 | Chapman | .............. | H04L 63/102 713/153 |
| 8,700,892 B2* | 4/2014 | Bollay | .................... | H04L 67/14 713/153 |
| 10,820,197 B2* | 10/2020 | Rosenberg | .............. | H04W 8/06 |
| 10,944,769 B2* | 3/2021 | Singh | .................. | H04L 63/0281 |
| 11,049,349 B2* | 6/2021 | Onischuk | ............... | G07C 13/00 |
| 11,133,933 B1* | 9/2021 | Grund | ................. | G06F 16/2471 |
| 2007/0180226 A1* | 8/2007 | Schory | ................ | H04L 63/0218 713/153 |
| 2015/0052361 A1* | 2/2015 | Winkler-Teufel | ..... | H04W 12/10 713/171 |
| 2020/0412651 A1* | 12/2020 | Patidar | ................ | H04L 63/0471 |

* cited by examiner

*Primary Examiner* — Amare F Tabor
(74) *Attorney, Agent, or Firm* — Su IP Consulting

(57) ABSTRACT

A distributed system, such as a distributed storage system in a virtualized computing environment and having storage nodes arranged in a cluster, is provided by management server with a transition period between non-encryption and encryption modes of operation. The transition period enables all of the nodes to complete a transition from the non-encryption mode of operation to the encryption mode of operation, without loss of data-in-transit (DIT). An auto-remediation feature is provided by the management server to the cluster, so as to fix inconsistent state(s) of one or more nodes in the cluster.

21 Claims, 5 Drawing Sheets

WORKFLOW FOR ENABLING DATA-IN-TRANSIT IN A DISTRIBUTED SYSTEM

CROSS-REFERENCE TO RELATED APPLICATION

The present application claims the benefit of Patent Cooperation Treaty (PCT) Application No. PCT/CN2020/119808, filed Oct. 5, 2020, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A software-defined approach may be used to create shared storage for VMs, thereby providing a distributed storage system in a virtualized computing environment. Such software-defined approach virtualizes the local physical storage resources of each of the hosts and turns the storage resources into pools of storage that can be divided and assigned to VMs and their applications. The distributed storage system typically involves an arrangement of virtual storage nodes that communicate data with each other and with other devices.

For example, a distributed storage system may include a cluster of storage nodes such that the same piece of data is replicated in each storage node of the cluster. When the data is modified in one of the storage nodes, the modifications are replicated/propagated to the other storage nodes so as to provide consistency in the data throughout the cluster. Data replication is just one example of data communications between storage nodes. Data may be communicated for other purposes from one storage node to another storage node or between various devices and the storage node(s), such as via data-in-transit (DIT) communications between storage nodes and devices using input/output (I/O) operations.

As a security feature, some DIT communications to/from storage nodes may be encrypted, wherein the storage nodes transition between non-encryption and encryption modes of operation dependent on whether the DIT communications require security. However, challenges exist in avoiding data loss when storage nodes in a cluster transition between non-encryption and encryption modes of operation for DIT communications.

DETAILED DESCRIPTION

Figure 1:
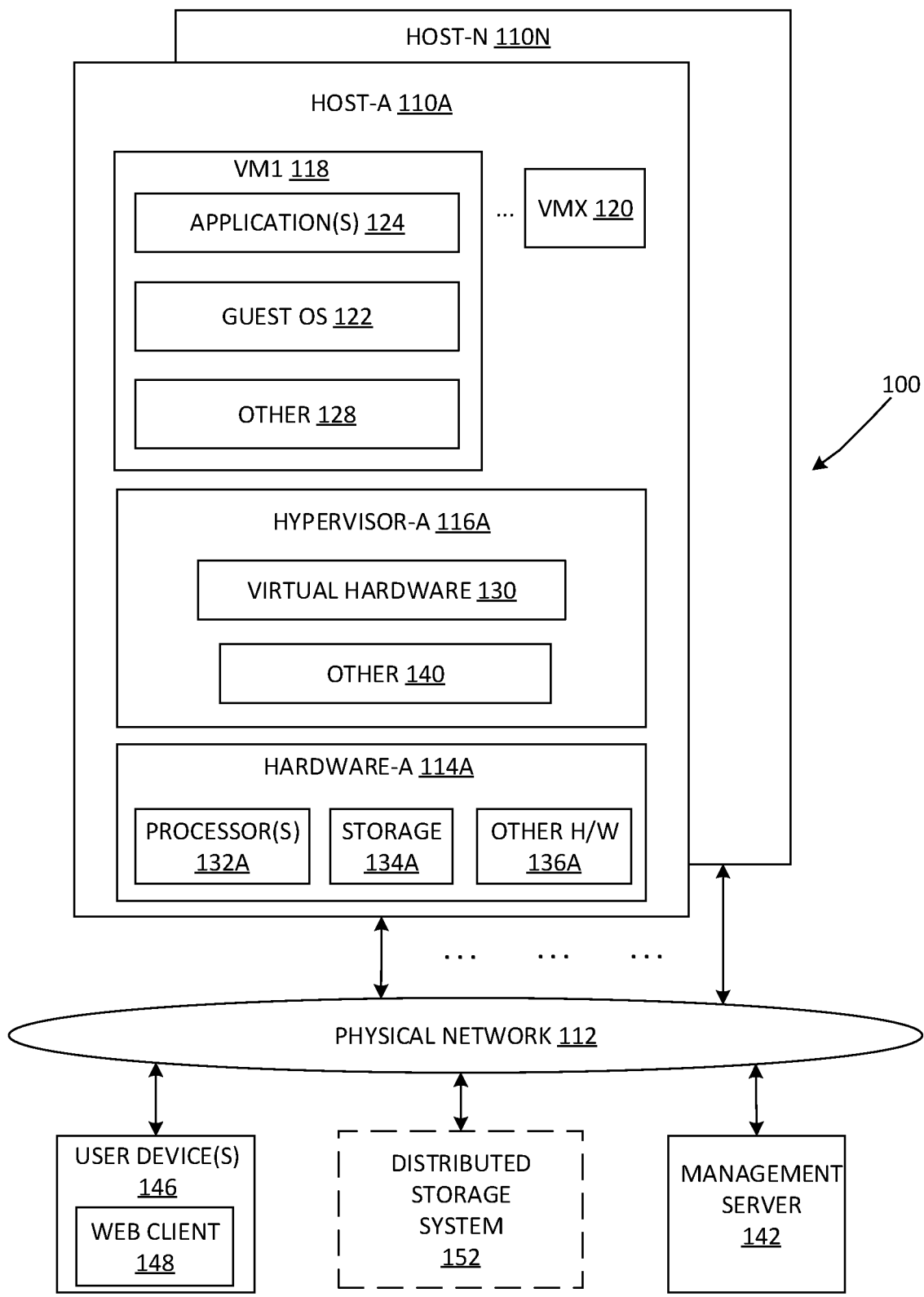
FIG. 1 is a schematic diagram illustrating an example virtualized computing environment having a distributed storage system that implements a method to provide a transition period for enabling DIT encryption.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the drawbacks associated with transitioning nodes between non-encryption and encryption modes of operation, such as by configuring storage nodes in a cluster in a distributed storage system with a 3-stage transition process that is controlled by a management server and that eliminates potential message exchange issues when enabling DIT encryption. A transition period is provided for the cluster to completely enable DIT encryption, and eventually after the transition period, DIT encryption/configuration is enforced cluster wide. An auto-remediation feature is also provided in case any error/inconsistency occurred during the transition to the DIT encryption. The auto-remediation feature recovers the encryption state in the distributed storage system and makes the DIT configuration consistent cluster wide.

Computing Environment

In some embodiments, the technology described herein may be implemented in a distributed storage system provided in a virtualized computing environment, wherein the distributed storage system includes clusters of storage nodes that are able to transition between non-encryption and encryption modes of operation for DIT communications. In other embodiments, the technology may be implemented in a storage system provided in other types of computing environments (which may not necessarily involve a virtualized computing environment), such as a storage system having clusters of physical storage devices that store data and that are also able to transition between non-encryption and encryption modes of operation for DIT communications. For still other embodiments, the technology may be implemented for other types of nodes in a computing environment, alternatively or additionally to storage nodes in a distributed storage system. For the sake of illustration and explanation, the various embodiments will be described below in the context of storage nodes in a distributed storage system provided in a virtualized computing environment.

Various implementations will now be explained in more detail using FIG. 1, which is a schematic diagram illustrating an example virtualized computing environment 100 that can provide distributed storage functionality. More specifically, FIG. 1 is a schematic diagram illustrating an example virtualized computing environment 100 having a distributed storage system that implements a method to provide a transition period for enabling DIT encryption. Depending on the desired implementation, the virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMX 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may include still further other elements, generally depicted at 128, such as a virtual disk, agents, engines, modules, and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include still further other elements, generally depicted at 140, such as a virtual switch, agent(s), etc. In some embodiments, the other elements 140 and/or 128 may include an encryption engine configured to transition operational modes of the host-A 110A (and/or its sub-elements such as VMs, storage resources 134A, operating system(s), etc.) between non-encryption and encryption modes of operation, such as an encryption mode of operation wherein outgoing communications/data are encrypted and incoming communications/data are decrypted (if necessary) by the host-A 110A and/or its sub-elements. The other elements 140 and/or 128 may be responsible for creating, maintaining/accepting, or converting non-encrypted or encrypted connections, performing encryption/decryption of data, processing the sending/receiving of data over the connections, etc.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource(s) 134A of the host-A 110A and the corresponding storage resource(s) of each of the other hosts) can be aggregated together to form a shared pool of storage in the distributed storage system 152 that is accessible to and shared by each of the host-A 110A . . . host-N 110N, and such that virtual machines supported by these hosts may access the pool of storage to store data. In this manner, the distributed storage system 152 is shown in broken lines in FIG. 1, so as to symbolically convey that the distributed storage system 152 is formed as a virtual/logical arrangement of the physical storage devices (e.g., the storage resource(s) 134A of host-A 110A) located in the host-A 110A . . . host-N 110N. However, in addition to these storage resources, the distributed storage system 152 may also include stand-alone storage devices that may not necessarily be a part of or located in any particular host.

A management server 142 or other management entity of one embodiment can take the form of a physical computer with functionality to manage or otherwise control the operation of host-A 110A . . . host-N 110N, including operations associated with the distributed storage system 152. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100 (including managing the operation of the distributed storage system 152). In one embodiment, the management server 142 may be configured to orchestrate or otherwise manage the transition of storage nodes between non-encryption and encryption modes of operation in the distributed storage system 152, in connection with DIT communications, and as will be explained in further detail below.

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, distributed storage system 152, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMX 120 (including operating the applications 124), using a web client 148. The user device 146 can be in the form of a computer, including desktop computers and portable computers (such as laptops and smart phones). In one embodiment, the user may be a system administrator that uses the web client 148 of the user device 146 to remotely communicate with the management server 142 via a management console for purposes of performing operations such as configuring, managing, diagnosing, remediating, etc. for the VMs and hosts (including configuring and initiating DIT encryption for the distributed storage system 152). The user may also be any general user, such as a consumer that is using the services (e.g., the application 124) provided by VM1 118 and/or using the distributed storage system 152.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Distributed Storage System with Transitional Stages for DIT Encryption

Figure 2:
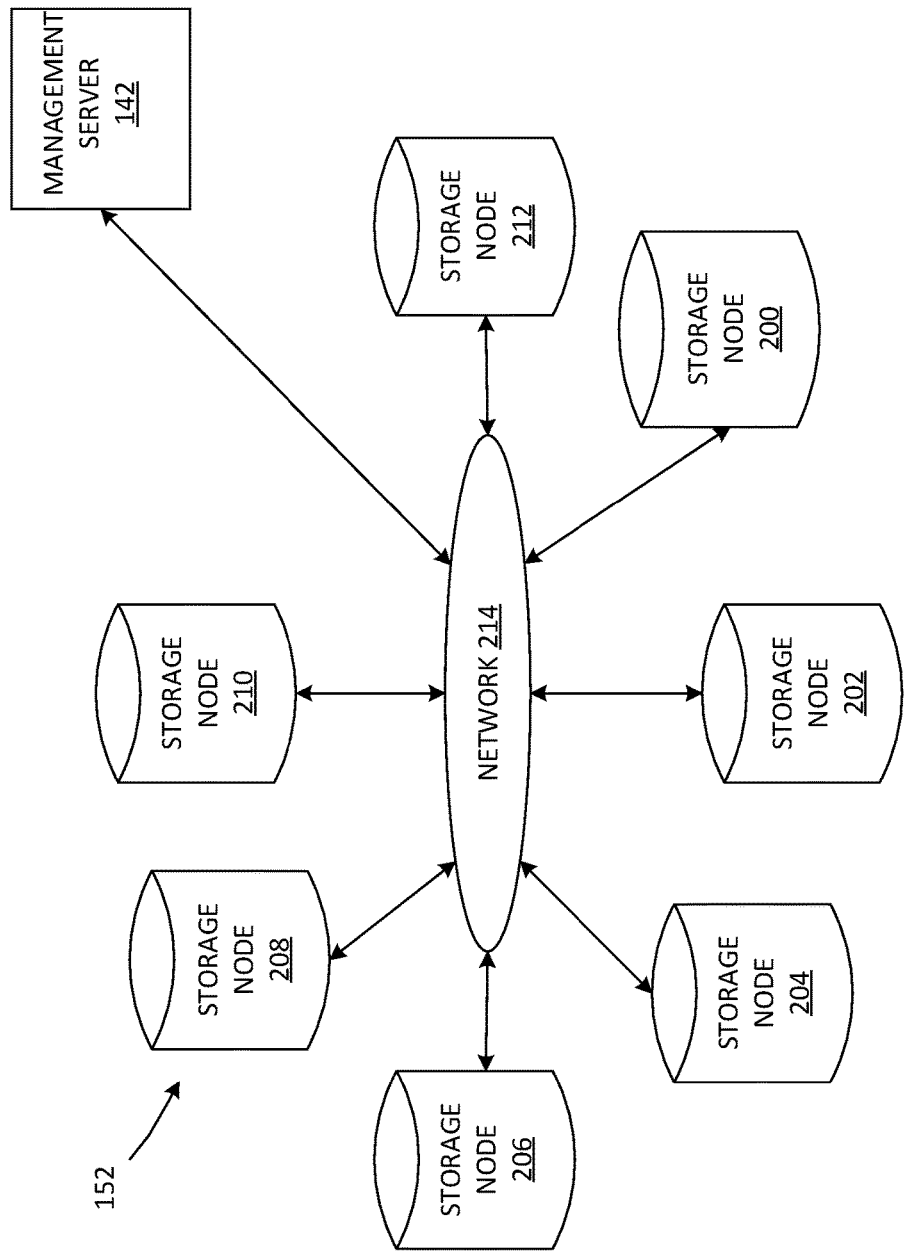
FIG. 2 is a schematic diagram illustrating further details of the distributed storage system of FIG. 1.

FIG. 2 is a schematic diagram illustrating further details of the distributed storage system 152 of FIG. 1. Specifically, FIG. 2 diagrammatically represents a cluster of storage nodes 200-212 in the distributed storage system 152. As previously explained above with respect to FIG. 1, the various storage locations in the distributed storage system 152 may be provided by aggregating the respective physical storage resources of the hosts in FIG. 1. Thus, for example, the storage node 202 may be a virtual storage node that is formed by aggregating the storage resource 134A (or portion thereof) of host-A 110A and the storage resource (or portion thereof) of some other host(s). The other storage nodes 204, 206, 208, etc. may also be virtual storage nodes that are provided by aggregating storage resources (or portions thereof) of the various hosts in the virtualized computing environment 100. It is also possible for an individual one of the storage nodes 200-212 to be provided by only a single host, and also possible for a single host to allocate its storage resources for multiple storage nodes. Also, some of the storage nodes 200-212 may be a physical storage node in the form of a standalone storage device, rather than being a virtual storage node that is provided by way of an aggregation of storage resources. For the sake of illustration and explanation, the nodes will be described herein in the context of being storage nodes for various implementations involving transitions to/from DIT encryption modes of operation in the distributed storage system 152 for the virtualized computing environment 100. The nodes can be hosts, other types of physical machines, virtual appliances, etc. in other implementations involving a virtualized or non-virtualized computing environment where transitions occur between non-encryption and encryption modes of operation.

The storage nodes 200-212 may communicate with each other via a network 214. Moreover, entities outside of the distributed storage system 152 (such as VMs, user devices, external devices/networks, etc.) may communicate with one or more of the storage nodes 200-212 via the network 214. The network 214 may be a physical network (wired or wireless) or a logical network, which are provided/supported through the physical network 112 or other network/connections. The management server 142 can communicate with any of the storage nodes 200-212 via the network 214, in order to perform management operations for the distributed storage system 152, such as controlling transitions between non-encryption and encryption modes of operation for the storage modes 200-212.

Each of the storage nodes 200-212 stores data associated with operating the virtual machines of the virtualized computing environment 100 and/or other types of data. This data may include data used or generated by the applications 124 or by the operating system(s), data that is uploaded to the distributed storage system 152 by a user, system/network health and performance data, and so forth. In implementations wherein the data is required to be current and consistent throughout the storage nodes, each of the storage nodes 200-212 will store the same data (e.g., the data is replicated in each of the storage nodes 200-212).

With some distributed systems, such as in distributed storage systems, data can be communicated between storage nodes in a cluster using encrypted or non-encrypted connections. For instance, a storage node can operate in a non-encryption mode of operation wherein the storage node sends non-encrypted data and receives non-encrypted data via non-encrypted connections with other storage nodes in the cluster. Analogously, a storage node can operate in an encryption mode of operation wherein the storage node sends encrypted data and receives encrypted data via encrypted connections with other storage nodes in the cluster, and the storage node (or some other element) may perform decryption of the data when appropriate for storage or retrieval from storage. The data communicated between the storage nodes may be referred to as data-in-transit (DIT), and the storage nodes may be enabled/activated with a DIT encryption configuration when the DIT is required to be communicated via secure connections.

However, activating a DIT encryption configuration for a distributed system, without impacting message exchanges between the nodes during the transition from a non-encryption mode of operation to an encryption mode of operation for the nodes, can be challenging. For example, ongoing data input/output (I/O) still exists when activating the DIT encryption configuration, such as metadata I/O or user I/O that is communicated to/from storage nodes. Different nodes in a single cluster typically cannot be guaranteed to reach the encryption mode of operation at the same time in a distributed system. Thus, when a particular node in the cluster reaches its encryption mode of operation earlier than other node(s) in the cluster, that particular node will reject the unencrypted message(s)/data sent from the other node(s) that are still in the non-encryption mode of operation (e.g., have not yet completed their transition to the encryption mode of operation). Such a condition results in data loss, since the particular node (which has completed its transition to the encryption mode of operation) is unable to accept or process and/or forward non-encrypted messages/data received via non-encrypted connections with the other nodes (e.g., such other nodes are still operating in the non-encryption mode of operation and are thus unable to provide encrypted connections that can be accepted/processed by other nodes in the cluster that are now actively operating in the encryption mode of operation).

Figure 3:
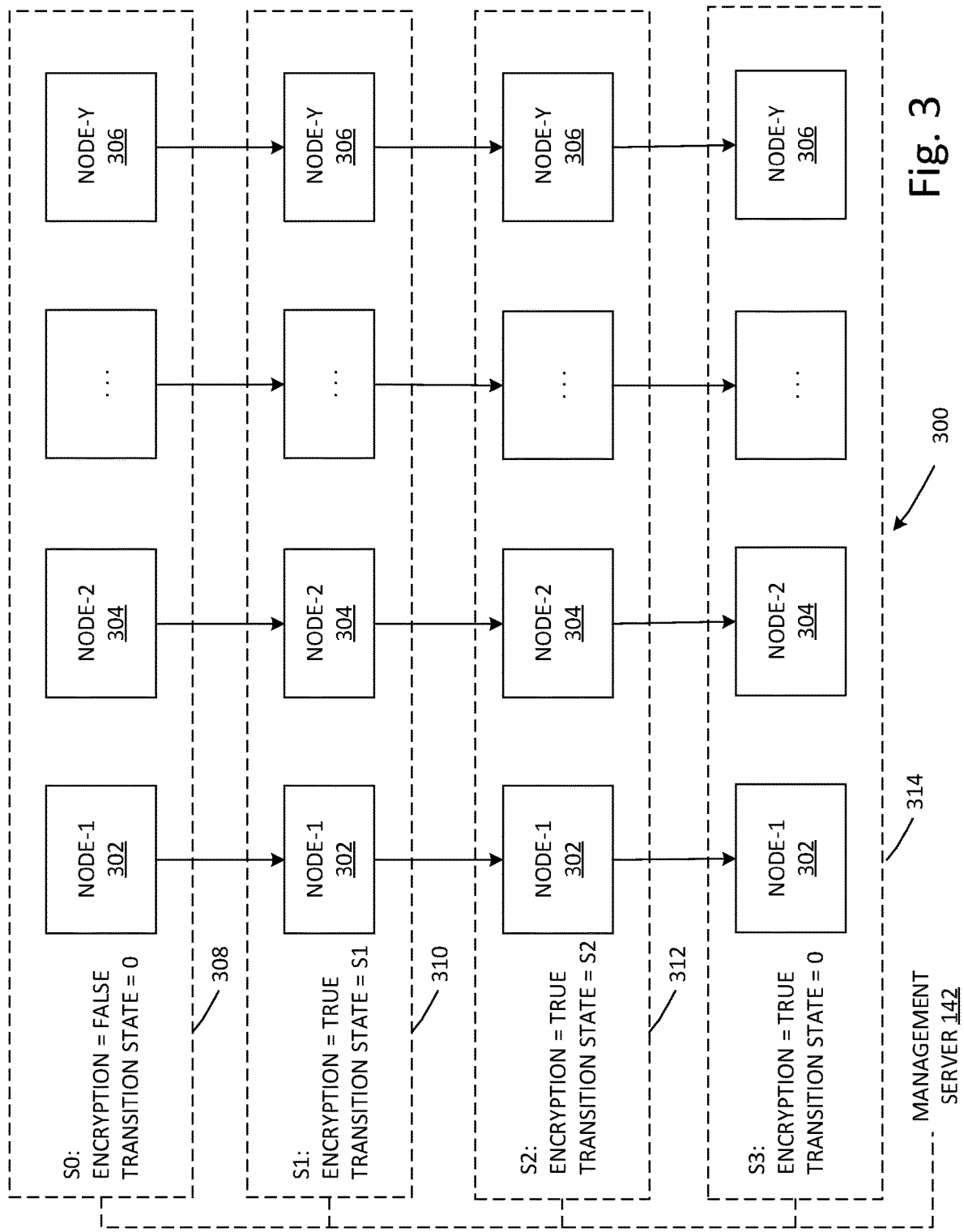
FIG. 3 is a schematic diagram showing transition states for DIT encryption used in the distributed storage system of FIG. 2.

To address the above issues, the storage nodes 200-212 in the distributed storage system 152 can be provided with multiple transition states for DIT encryption, such as transition states for entering (or exiting) encryption modes of operation. The transition states provide time to enable relatively slower-transitioning storage nodes to eventually reach the same encryption state as relatively faster-transitioning storage nodes, while also enabling communications/data to be successfully sent and received at each of the nodes during the transition state(s). FIG. 3 shows and explains the workflow (as orchestrated by the management server 142) for transition states in more detail. More specifically, FIG. 3 is a schematic diagram showing various transition states for DIT encryption used in the distributed storage system 152 of FIG. 2.

In FIG. 3, node-1 302, node-2 304, . . . node-Y 306 are arranged in a cluster 300. For instance, node-1 302, node-2 304, . . . node-Y 306 may be the storage nodes 200-212 in the distributed storage system 152 of FIG. 2, arranged in the cluster 300. The management server 142 commands node-1 302, node-2 304, . . . node-Y 306 to operate in stages S0-S3 (depicted in dashed lines and boxes in FIG. 3). The notation ENCRYPTION in FIG. 3 is the desired state of DIT encryption as commanded by the management server 142, and has a value of either TRUE or FALSE. The notation TRANSITION STATE is used to mark the different transition stages towards the desired state. Each node-1 302, node-2 304, . . . node-Y 306 in FIG. 3 may take different times to switch from one stage to another stage.

A node can accept and/or create a connection. That is, an accepted connection for a node is an incoming connection to the node, and a created connection is an outgoing connection from the node. Data is transferred through different connections amongst the nodes. A node is a client node if a connection is initialized from this node; otherwise the node is a server node. Also, node can act as both as a client node and a server node at the same time. Thus, each node can only impact its outgoing connections. The management server 142 may activate DIT encryption for the cluster 300, which triggers the nodes go through each stage S0-S3 in order.

Stage S0 (at state 308) represents an initial state wherein all nodes (node-1 302, node-2 304, . . . node-Y 306) are operating in the non-encryption mode of operation. This stage S0 is thus represented by an encryption state of ENCRYPTION=FALSE and transition stage of TRANSITION STATE=0. In this non-encryption mode of operation, each node accepts only non-encrypted connections (e.g., incoming data into each node is non-encrypted), and each node creates only non-encrypted connections (e.g., outgoing data from each node is non-encrypted).

The management server 142 then sends a command to all nodes in the cluster 300 to transition into the encryption mode of operation for DIT encryption, and so all of the nodes enter stage S1 (at state 310). This stage S1 is thus represented by an encryption state of ENCRYPTION=TRUE and transition stage of TRANSITION STATE=S1. In this stage S1, the nodes accept both encrypted and non-encrypted connections, but create new connections only as non-encrypted connections. This stage S1 can thus be considered as an encryption-preparation stage.

The management server 142 then sends a command to all nodes in the cluster 300 to enter stage S2 (at state 312). This stage S2 is thus represented by an encryption state of ENCRYPTION=TRUE and transition stage of TRANSITION STATE=S2. In this stage S2, the nodes accept both encrypted and non-encrypted connections, create new connections as encrypted connections, and convert existing connections that are in place into encrypted connections. This stage S2 can thus be considered as an encryption-prepared stage. Any en route (in-transit) non-encrypted messages/data sent via non-encrypted connections are properly received at the remote/recipient node, and so data loss is thus avoided. Such messages/data may also be subsequently encrypted at the recipient node for sending out via the outgoing encrypted connections from that node.

With stages S1 and S2, the nodes are therefore converted gradually from the non-encrypted mode of operation to the encrypted mode of operation. The time for the nodes to switch from one stage to a next stage and/or the amount of time that a node remains in a particular stage can vary from one implementation to another. For example, a node can remain in stage S2 (and/or in stage S1) for several seconds or other amount of time sufficient to enable currently in-transit non-encrypted messages/data to reach their next destination node and for the connections between to become clear of in-transit non-encrypted messages/data.

The management server 142 then clears the transition state for all the nodes and forces them to the encrypted mode of operation in stage S3 (at state 314). This stage S3 is thus represented by an encryption state of ENCRYPTION=TRUE and transition stage of TRANSITION STATE=0. In this stage S3, the nodes operate in the encryption mode of operation, and therefore only accept encrypted connections and create new connections as encrypted connections. This stage S3 can thus be considered as an encryption-completion stage, wherein the cluster 300 has reached a stable state with DIT encryption enabled.

The DIT encryption workflow as described above is controlled by a 3-stage transition model (e.g., stages S1-S3). However, exceptions could be encountered during any transition stage, which could thereby leave the cluster 300 in an inconsistent state. For example, most of the nodes presently may be at stage S2, but some existing or newly added nodes may be at some other stage (including undefined stages).

Figure 4:
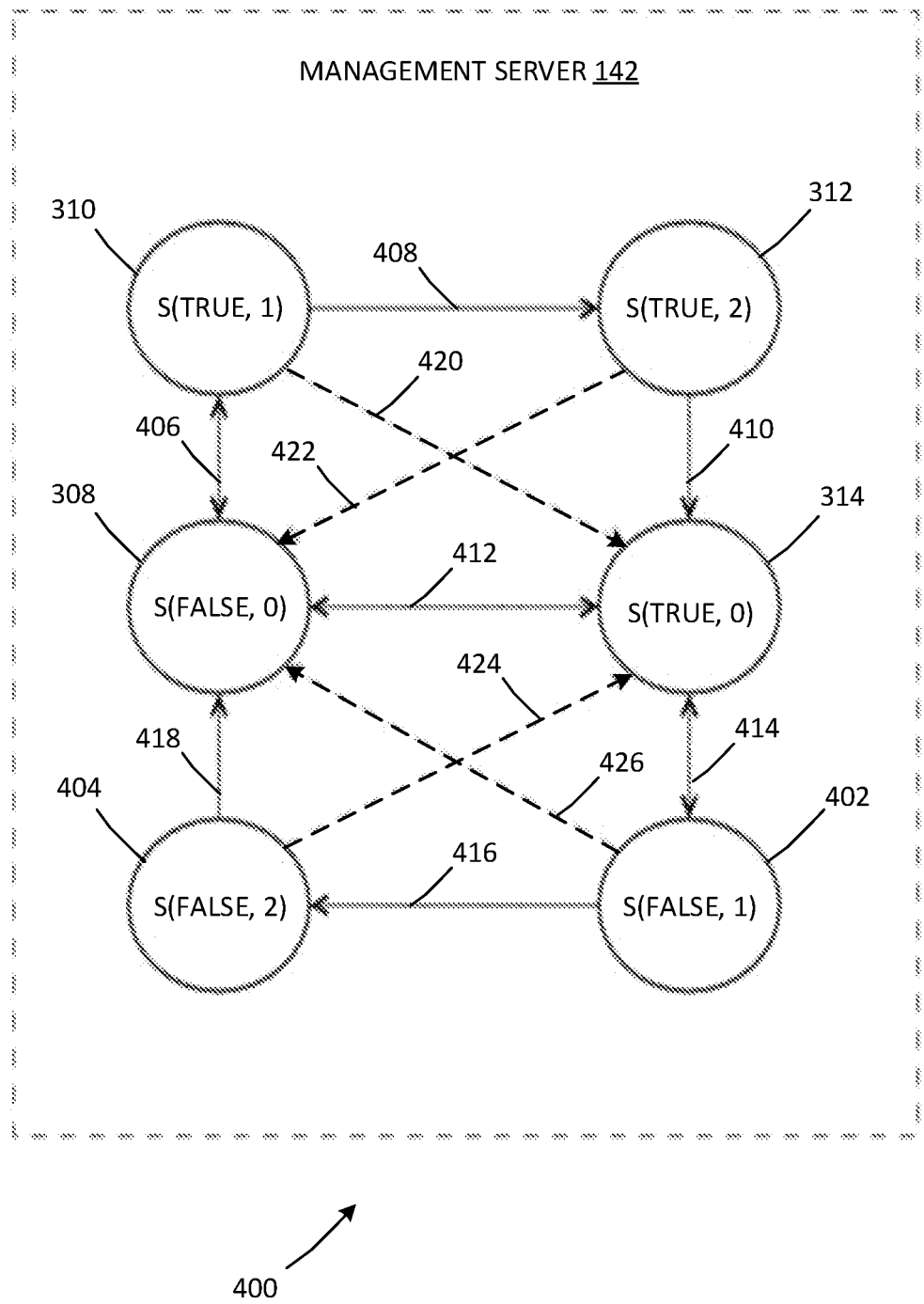
FIG. 4 is a state diagram that illustrates the operation of an auto-remediation feature for DIT encryption used in the distributed storage system of FIG. 2.

In situations that involve nodes in the cluster 300 being in inconsistent stages/states, an auto-remediation feature is provided for the DIT encryption workflow so as to bridge the gap caused by inconsistencies. Specifically, FIG. 4 is a state diagram 400 that illustrates the operation of the auto-remediation feature for DIT encryption that may be used in the distributed storage system 152 of FIG. 2. The transition of nodes (in the cluster 300 of FIG. 3) between the stages/states shown in FIG. 4 may be controlled by the management server 142 attempting to fix the inconsistent state(s).

In the state diagram 400 of FIG. 4, each state S is represented by a combination of values, in the form of S(ENABLED, STATE). Consistent with the notation used in FIG. 3, the encryption value ENABLED could be TRUE or FALSE, and the stage or STATE value could be 0, 1, or 2. Thus, a stage of an individual node could have a state of S(FALSE, 0) corresponding to state 308 in FIG. 3, S(TRUE, 1) corresponding to state 310 in FIG. 3, S(TRUE, 2) corresponding to state 312 in FIG. 3, S(True, 0) corresponding to state 314 in FIG. 3, S(FALSE, 1) corresponding to state 402 in FIG. 404, and S(FALSE, 2) corresponding to state 404 in FIG. 4.

The states S(True, 0) and S(False, 0) are considered to be the two stable states for one node. The auto-remediation feature depicted by the state diagram 400 of FIG. 4 operates as a state-driven machine.

For instance and as depicted previously in FIG. 3, each of the nodes transition from the non-encryption mode of operation into a DIT encryption mode of operation, by transitioning from state S(FALSE, 0) to states S(TRUE, 1) to S(TRUE, 2) to S(True, 0) in sequence, via the arrows 406, 408, and 410.

There may also be a transition from the encryption mode of operation to the non-encryption mode of operation, by transitioning from state S(True, 0) to states S(FALSE, 1) to S(FALSE, 2) to S(False, 0) in sequence, via arrows 414, 416, and 418. For example, for the state S(FALSE, 1) in a fourth stage, the nodes accept both encrypted and non-encrypted connections but create new connections only as encrypted connections. For the next state S(FALSE, 2) in a fifth stage, the nodes accept both encrypted and non-encrypted connections, create new connections as non-encrypted connections, and convert existing connections that are in place into non-encrypted connections. Then at the state S(FALSE, 0) as a sixth stage, the non-encryption mode of operation is enforced wherein the nodes only accept non-encrypted connections and create new connections as only non-encrypted connections.

Some nodes may transition directly between stable states, such as represented by the double-headed arrow 412 between states S(False, 0) and S(True, 0).

One or more nodes may be present that have states that are inconsistent with other nodes in the cluster 300. This inconsistency may be due to the node(s) having lost track of its state, the node(s) having transitioned faster/slower to another state relative to other nodes, the node(s) being newly added, or due to other reason(s). As an example, a particular node may be at state S(TRUE, 1), shown at 310 in FIG. 4, while all of the other nodes in the cluster 300 may be at state S(FALSE, 0) shown at 308, or at state S(TRUE, 2) shown at 312, or at state S(TRUE, 0) shown at 314, or at some other state common/consistent between these other nodes. In such a situation, the auto-remediation feature forces the particular node to transition from state S(TRUE, 1) to the closest stable state (e.g., transition to either state S(FALSE, 0) via the double-headed arrow 406 or state S(TRUE, 0) via the dashed arrow 420).

Analogously, a particular node may be at state S(TRUE, 2), shown at 312 in FIG. 4, while all of the other nodes in the cluster 300 may be at some other common/consistent state. Thus, the auto-remediation feature forces the particular node to transition from state S(TRUE, 2) to the closest stable state (e.g., transition to either state S(FALSE, 0) via the dashed arrow 422 or state S(TRUE, 0) via the arrow 410).

Still analogously, a particular node may be at state S(FALSE, 2), shown at 404 in FIG. 4, while all of the other nodes in the cluster 300 may be at some other common/consistent state. Thus, the auto-remediation feature forces the particular node to transition from the state S(FALSE, 2) to the closest stable state (e.g., transition to either state S(FALSE, 0) via the arrow 418 or state S(TRUE, 0) via the dashed arrow 424).

As yet another example, a particular node may be at state S(FALSE, 1), shown at 402 in FIG. 4, while all of the other nodes in the cluster 300 may be at some other common/consistent state. Thus, the auto-remediation feature forces the particular node to transition from the state S(FALSE, 1) to the closest stable state (e.g., transition to either state S(FALSE, 0) via the dashed arrow 426 or state S(TRUE, 0) via the double-headed arrow 414).

In some implementations, transitions not shown in the state diagram 400 may be ignored by the management server 142 or handled as bad requests (e.g., impermissible transitions). For instance, a request or attempt by a particular node to transition from state S(TRUE, 0) to state S(TRUE, 1), or from state S(TRUE, 0) to state S(FALSE, 2), may be detected and then ignored/prevented by the management server 142 and reported to a system administrator at the user device 146 shown in FIG. 1 for further investigation. Furthermore in some implementations, newly added clusters can be configured to operate at a stable state (e.g., either of the states S(FALSE, 0) or S(TRUE, 0) at the onset).

Figure 5:
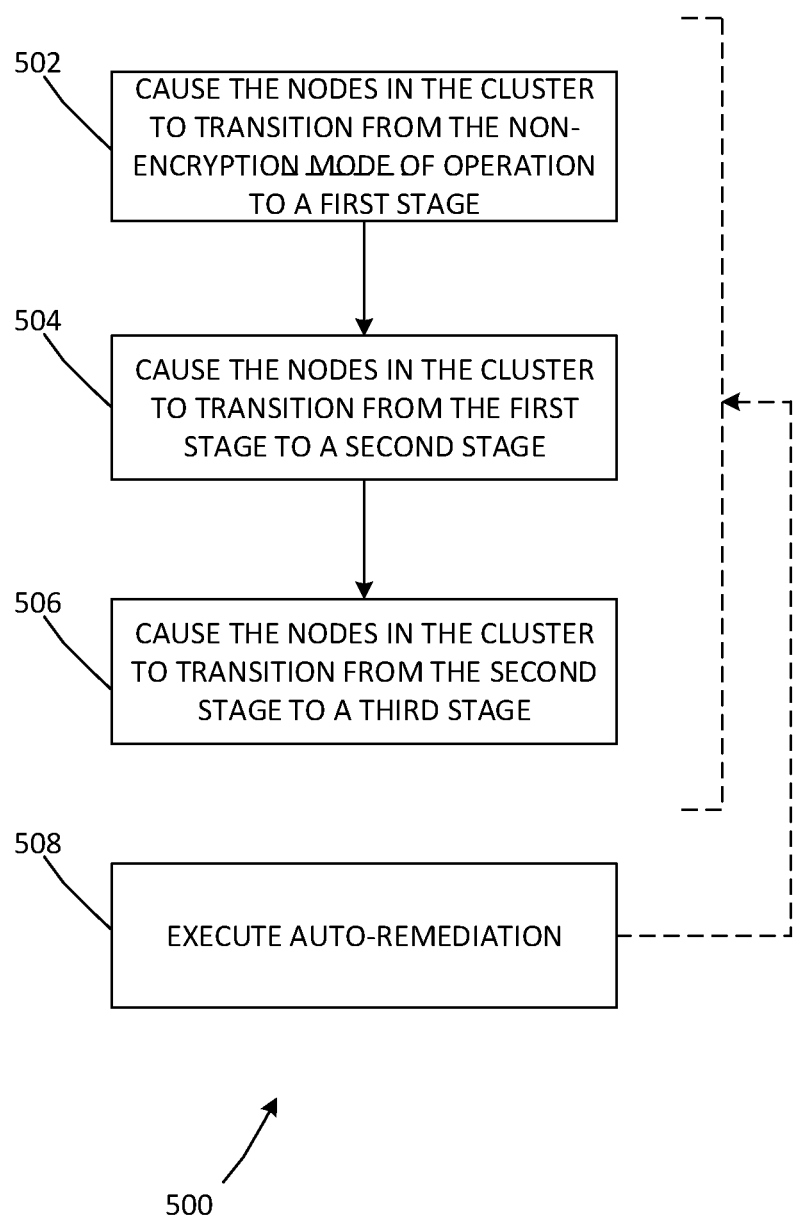
FIG. 5 is a flowchart of an example method to provide a transition period for enabling DIT encryption in the virtualized computing environment of FIG. 1.

FIG. 5 is a flowchart of an example method to provide a transition period for enabling DIT encryption in the virtualized computing environment 100 of FIG. 1. The method 500 can be performed in one embodiment by the management server 142, in cooperation with the nodes, hosts, and/or other elements in a cluster. The example method 500 may include one or more operations, functions, or actions illustrated by one or more blocks, such as blocks 502 to 508. The various blocks of the method 500 and/or of any other process(es) described herein may be combined into fewer blocks, divided into additional blocks, supplemented with further blocks, and/or eliminated based upon the desired implementation. In one embodiment, the operations of the method 500 and/or of any other process(es) described herein may be performed in a pipelined sequential manner. In other embodiments, some operations may be performed out-of-order, in parallel, etc.

The method 500 may begin at a block 502 ("CAUSE THE NODES IN THE CLUSTER TO TRANSITION FROM THE NON-ENCRYPTION MODE OF OPERATION TO A FIRST STAGE"), wherein the management server 142 initiates the transition of the nodes in the cluster 300 into a DIT encryption configuration. The management server 142 sends a command to the nodes to enter the first stage S1 (from an initial stage S0 such as shown in FIG. 3). During the first stage S1, the nodes accept non-encrypted and encrypted connections and create new connections as non-encrypted connections The block 502 may be followed by a block 504 ("CAUSE THE NODES IN THE CLUSTER TO TRANSITION FROM THE FIRST STAGE TO A SECOND STAGE"), wherein the management server 142 sends a command to the nodes in the cluster to transition from the first stage S1 to the second stage S2. In the second stage S2, the nodes accept non-encrypted and encrypted connections, create new connections only as encrypted connections, and convert existing non-encrypted connections to encrypted connections.

The block 504 may be followed by a block 506 ("CAUSE THE NODES IN THE CLUSTER TO TRANSITION FROM THE SECOND STAGE TO A THIRD STAGE"), wherein the management server 142 sends a command to the nodes in the cluster to transition from the second stage S2 to the third stage S3. The third stage S3 corresponds to the encryption mode of operation for the nodes, wherein the nodes operate to accept only encrypted connections and to create new connections only as encrypted connections.

The management server 142 may execute the auto-remediation feature at a block 508 ("EXECUTE AUTO-REMEDIATION FEATURE") at any appropriate time during the method 500, as symbolically represented in FIG. 5 by dashed lines. The management server 142 determines that a particular node in the cluster has an encryption state that is inconsistent with an encryption state of other nodes in the cluster, and so the management server 142 commands the particular node to transition to a stable encryption state, such as either the non-encryption mode of operation prior to transition to the first stage or the encryption mode of operation at the third stage. The auto-remediation may be performed as a background process that is not readily visible or detectable by a user of the cluster 300.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 1 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment and/or storage nodes in distributed storage system), wherein it would be beneficial to provide a transition period for nodes in the computing environment to transition between non-encryption and encryption modes of operations such as described herein.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to provide a transition period between non-encryption and encryption modes of operation in a distributed system having nodes arranged in a cluster, the method comprising:
   causing the nodes in the cluster to transition from the non-encryption mode of operation to a first stage, wherein during the first stage: the nodes accept non-encrypted and encrypted connections and create new connections as non-encrypted connections;
   causing the nodes in the cluster to transition from the first stage to a second stage, wherein during the second stage: the nodes accept non-encrypted and encrypted connections, create new connections as encrypted connections, and convert existing non-encrypted connections to encrypted connections; and
   causing the nodes in the cluster to transition from the second stage to a third stage, wherein the nodes in the third stage operate in the encryption mode of operation to accept encrypted connections and to create new connections as encrypted connections.

2. The method of claim 1, wherein the nodes create the new connections only as encrypted connections during the first stage, and wherein the nodes only accept encrypted connections during the second stage and create the new connections only as encrypted connections during the second stage.

3. The method of claim 1, further comprising:
determining that a particular node in the cluster has an encryption state that is inconsistent with an encryption state of other nodes in the cluster; and
causing the particular node to transition to a stable encryption state, wherein the stable encryption state corresponds to either the non-encryption mode of operation prior to transition to the first stage or the encryption mode of operation at the third stage.

4. The method of claim 1, further comprising:
detecting an attempt or request by a particular node in the cluster to perform an impermissible transition between encryption states;
preventing the transition by the particular node between the encryption states; and
reporting the attempt or request by the particular node to perform the impermissible transition between the encryption states.

5. The method of claim 1, further comprising transitioning the nodes in the cluster from the encryption mode of operation to the non-encryption mode of operation, by:
causing the nodes in the cluster to transition from the encryption mode of operation to a fourth stage, wherein during the fourth stage: the nodes accept non-encrypted and encrypted connections and create new connections as encrypted connections;
causing the nodes in the cluster to transition from the fourth stage to a fifth stage, wherein during the fifth stage: the nodes accept non-encrypted and encrypted connections, create new connections as non-encrypted connections, and convert existing encrypted connections to non-encrypted connections; and
causing the nodes in the cluster to transition from the fifth stage to a sixth stage, wherein the nodes in the sixth stage operate in the non-encryption mode of operation to accept non-encrypted connections and to create new connections as non-encrypted connections.

6. The method of claim 1, wherein an amount of time spent by the nodes in at least one of the first stage or the second stage is sufficient to enable in-transit data in the accepted connections to reach a destination node.

7. The method of claim 1, wherein the distributed system includes a distributed storage system provided by a virtualized computing environment, and wherein the nodes include storage nodes in the distributed storage system.

8. A non-transitory computer-readable medium having instructions stored thereon, which in response to execution by one or more processors, cause the one or more processors to perform or control performance of a method to provide a transition period between non-encryption and encryption modes of operation in a distributed system having nodes arranged in a cluster, wherein the method comprises:
causing the nodes in the cluster to transition from the non-encryption mode of operation to a first stage, wherein during the first stage: the nodes accept non-encrypted and encrypted connections and create new connections as non-encrypted connections;
causing the nodes in the cluster to transition from the first stage to a second stage, wherein during the second stage: the nodes accept non-encrypted and encrypted connections, create new connections as encrypted connections, and convert existing non-encrypted connections to encrypted connections; and
causing the nodes in the cluster to transition from the second stage to a third stage, wherein the nodes in the third stage operate in the encryption mode of operation to accept encrypted connections and to create new connections as encrypted connections.

9. The non-transitory computer-readable medium of claim 8, wherein the nodes create the new connections only as encrypted connections during the first stage, and wherein the nodes only accept encrypted connections during the second stage and create the new connections only as encrypted connections during the second stage.

10. The non-transitory computer-readable medium of claim 8, wherein the method further comprises:
determining that a particular node in the cluster has an encryption state that is inconsistent with an encryption state of other nodes in the cluster; and
causing the particular node to transition to a stable encryption state, wherein the stable encryption state corresponds to either the non-encryption mode of operation prior to transition to the first stage or the encryption mode of operation at the third stage.

11. The non-transitory computer-readable medium of claim 8, wherein the method further comprises:
detecting an attempt or request by a particular node in the cluster to perform an impermissible transition between encryption states;
preventing the transition by the particular node between the encryption states; and
reporting the attempt or request by the particular node to perform the impermissible transition between the encryption states.

12. The non-transitory computer-readable medium of claim 8, wherein the method further comprises transitioning the nodes in the cluster from the encryption mode of operation to the non-encryption mode of operation, by:
causing the nodes in the cluster to transition from the encryption mode of operation to a fourth stage, wherein during the fourth stage: the nodes accept non-encrypted and encrypted connections and create new connections as encrypted connections;
causing the nodes in the cluster to transition from the fourth stage to a fifth stage, wherein during the fifth stage: the nodes accept non-encrypted and encrypted connections, create new connections as non-encrypted connections, and convert existing encrypted connections to non-encrypted connections; and
causing the nodes in the cluster to transition from the fifth stage to a sixth stage, wherein the nodes in the sixth stage operate in the non-encryption mode of operation to accept non-encrypted connections and to create new connections as non-encrypted connections.

13. The non-transitory computer-readable medium of claim 8, wherein an amount of time spent by the nodes in at least one of the first stage or the second stage is sufficient to enable in-transit data in the accepted connections to reach a destination node.

14. The non-transitory computer-readable medium of claim 8, wherein the distributed system includes a distributed storage system provided by a virtualized computing environment, and wherein the nodes include storage nodes in the distributed storage system.

15. A management server configured to provide a transition period between non-encryption and encryption modes of operation in a distributed system having nodes arranged in a cluster, the management server comprising:
one or more processors; and a non-transitory computer-readable medium coupled to the one or more processors, and having instructions stored thereon, which in response to execution by the one or more processors, cause the one or more processors to perform or control performance of operations that include:

cause the nodes in the cluster to transition from the non-encryption mode of operation to a first stage, wherein during the first stage: the nodes accept non-encrypted and encrypted connections and create new connections as non-encrypted connections;

cause the nodes in the cluster to transition from the first stage to a second stage, wherein during the second stage: the nodes accept non-encrypted and encrypted connections, create new connections as encrypted connections, and convert existing non-encrypted connections to encrypted connections; and cause the nodes in the cluster to transition from the second stage to a third stage, wherein the nodes in the third stage operate in the encryption mode of operation to accept encrypted connections and to create new connections as encrypted connections.

16. The management server of claim 15, wherein the nodes create the new connections only as encrypted connections during the first stage, and wherein the nodes only accept encrypted connections during the second stage and create the new connections only as encrypted connections during the second stage.

17. The management server of claim 15, wherein the operations further comprise:

determine that a particular node in the cluster has an encryption state that is inconsistent with an encryption state of other nodes in the cluster; and cause the particular node to transition to a stable encryption state, wherein the stable encryption state corresponds to either the non-encryption mode of operation prior to transition to the first stage or the encryption mode of operation at the third stage.

18. The management server of claim 15, wherein the operations further comprise:

detect an attempt or request by a particular node in the cluster to perform an impermissible transition between encryption states;

prevent the transition by the particular node between the encryption states; and report the attempt or request by the particular node to perform the impermissible transition between the encryption states.

19. The management server of claim 15, wherein to the operations further comprise:

transition the nodes in the cluster from the encryption mode of operation to the non-encryption mode of operation, by:

cause the nodes in the cluster to transition from the encryption mode of operation to a fourth stage, wherein during the fourth stage: the nodes accept non-encrypted and encrypted connections and create new connections as encrypted connections;

cause the nodes in the cluster to transition from the fourth stage to a fifth stage, wherein during the fifth stage: the nodes accept non-encrypted and encrypted connections, create new connections as non-encrypted connections, and convert existing encrypted connections to non-encrypted connections; and cause the nodes in the cluster to transition from the fifth stage to a sixth stage, wherein the nodes in the sixth stage operate in the non-encryption mode of operation to accept non-encrypted connections and to create new connections as non-encrypted connections.

20. The management server of claim 15, wherein an amount of time spent by the nodes in at least one of the first stage or the second stage is sufficient to enable in-transit data in the accepted connections to reach a destination node.

21. The management server of claim 15, wherein the distributed system includes a distributed storage system provided by a virtualized computing environment, and wherein the nodes include storage nodes in the distributed storage system.

* * * * *